Nov. 28, 1944.   J. LUNDGREN   2,364,026
BALANCE CALCULATOR
Filed Feb. 4, 1943   2 Sheets-Sheet 1

INVENTOR
Jacob Lundgren
BY
Herbert S. Fairbanks
ATTORNEY

Nov. 28, 1944.　　　J. LUNDGREN　　　2,364,026
BALANCE CALCULATOR
Filed Feb. 4, 1943　　　2 Sheets-Sheet 2
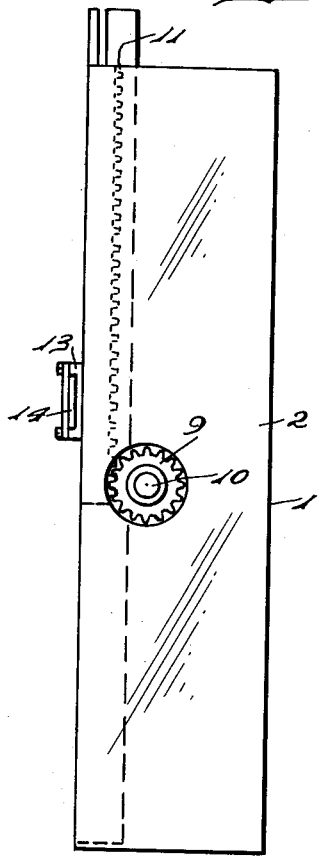
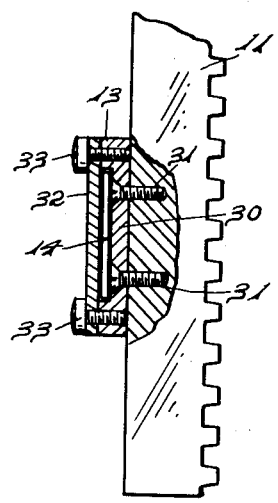
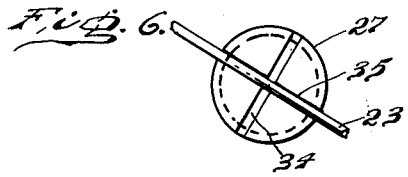
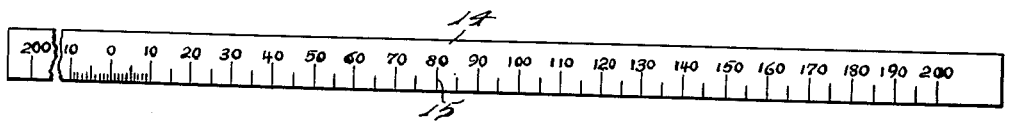
INVENTOR.
Jacob Lundgren
BY
Herbert S. Fairbanks Patented Nov. 28, 1944

2,364,026

UNITED STATES PATENT OFFICE 2,364,026

BALANCE CALCULATOR

Jacob Lundgren, Philadelphia, Pa., assignor to Tinius Olsen Testing Machine Company, Philadelphia, Pa., a corporation of Pennsylvania Application February 4, 1943, Serial No. 474,755

5 Claims. (Cl. 235—61)

The object of this invention is to devise a novel apparatus for determining the angle and amount of unbalance in relatively rotatable parts.

The relatively rotatable parts to be tested are revolved at a synchronous speed on the vibratory support of a balancing machine. The balancing machine may be of the well known "S" type or of the "E. O." type, both of which are manufactured and placed on the market by Tinius Olsen Testing Machine Company, of Philadelphia, Pa., or any other suitable type of balancing machine may be employed. The machine would preferably be provided with means to effect relative angular adjustment of the parts during their rotation.

A reading is taken during the revolution of the parts at any desired point in the rotation, and the angle and amount of the resultant unbalance of the parts is noted. The parts are then relatively, angularly adjusted 180°, and a second reading is taken of the resultant unbalance of the parts, and the angle and amount noted.

The present invention is concerned with the analysis and calculation from these two unbalance readings of the angles and amount of unbalance in each part of two relatively, rotatable parts.

For such calculations, I have devised a novel calculating instrument as shown in the drawings.

With the foregoing and other objects in view as will hereinafter clearly appear, my invention comprehends a novel apparatus for determining the angle and amount of unbalance in each of two relatively, rotatable parts, and such parts may or may not form an assembled unit.

Other novel features of construction will be set forth more in detail in the description and the appended claims.

For the purpose of illustrating the invention, I have shown in the accompanying drawings a preferred embodiment of it, which in practice will give satisfactory and reliable results.

It is, however, to be understood that this embodiment is typical only, and that the various instrumentalities of which the invention consists can be variously arranged and organized, and the invention is not limited to the exact arrangement and organization of these instrumentalities as herein shown.

Figure 3 is an end elevation.

Figure 4 is a plan view of a scale employed.

Figure 5 is a side elevation of a rack, with a carrier broken away to more clearly show the construction.

Figure 6 is a detail of the amount pointer plug and a portion of a position indicator.

Figure 7 is a side elevation of a pointer plug, showing more particularly a spring employed.

Similar numerals of reference indicate corresponding parts. Referring to the drawings:

Figure 1:
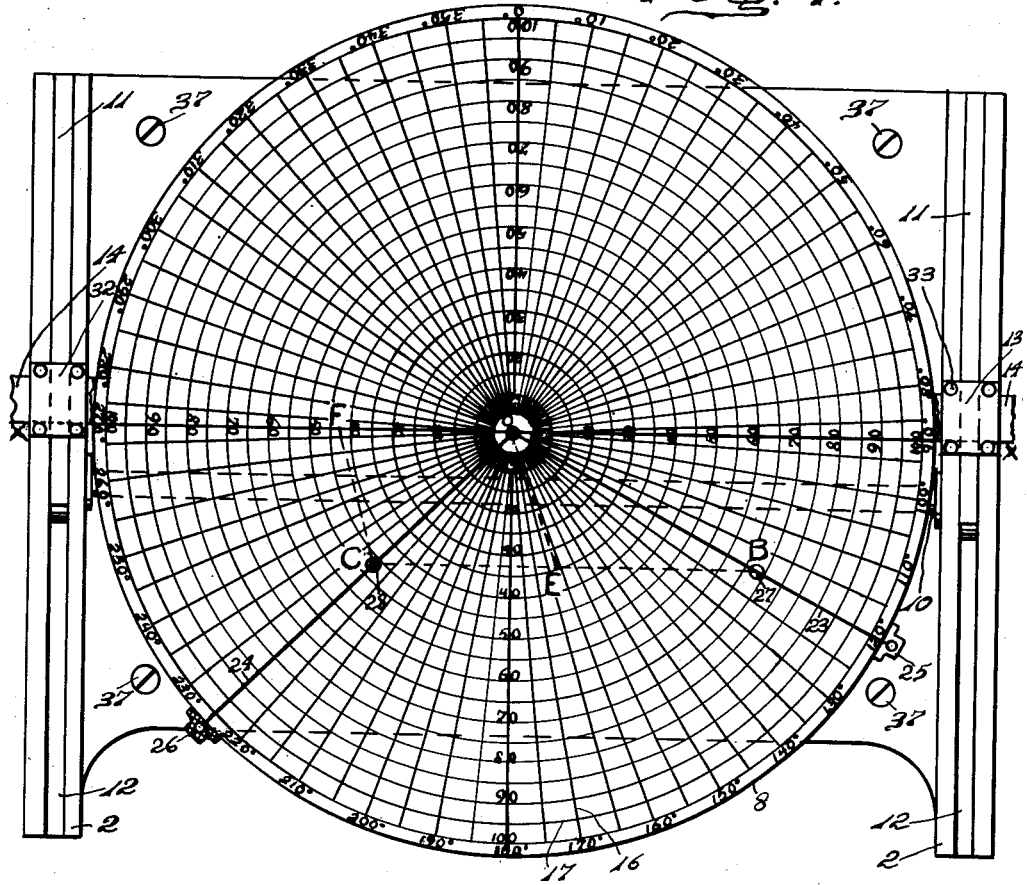
Figure 1 is a plan view of a calculating instrument.
Figure 2:
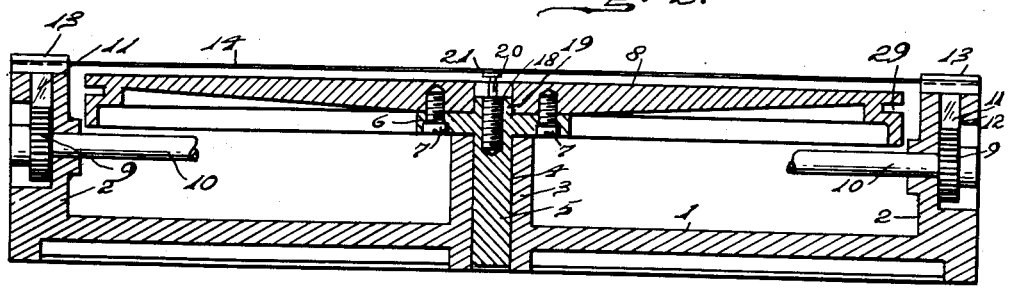
Figure 2 is a sectional elevation, taken on the center line.

The calculator has a base 1 having upwardly extending sides 2, and a central post 3, having an aperture 4 through it. A pivot member 5 is rotatable in the aperture 4, and has at its upper end a plate 6, secured by fastening devices 7 to a disc 8. The sides of the base are recessed to receive pinions 9, fixed to an off-center shaft 10, journalled in the sides. Racks 11, meshing with the pinions, are guided in slots 12 opening through the upper end of the sides 2, and each rack is fixed to a carrier 13. A scale 14 is longitudinally slidable in the carriers, and is graduated at 15 numbered in tenths, the graduations corresponding to the amount graduations numbered in tenths of a chart carried by or formed on the disc, as will hereinafter be set forth.

As illustrated, the scale is graduated from zero to 200, in opposite directions from the center of the scale. The springs 36 are in the form of split rings and the slots 34 and 35 are of such depth that the position indicators contact the springs, so that the amount indicators are frictionally retained in their adjusted positions.

The disc 8 forms a chart which is graduated with radial lines 16, spaced as shown, five degrees apart, and radiating from a common center O. The disc 8 is also graduated with concentric circles 17, alternately numbered 10 to 100, indicative of unbalance corresponding to the lines of graduations in tenths of the scale 14.

A screw 18 is threaded into the plate 6 and pivot 5, and the plate has an extension 19 which centers the disc 8. The screw 18 carries a pivot pin 20, having below its top an annular recess 21.

Two position indicators 23 and 24, each of the same construction and in the form of wires, are looped at their inner ends to be received in the annular recess of the pivot pin. The outer end of the position indicator 23 is fixed in any desired manner to a manually actuated handle 25, and, in a similar manner, the position indicator 24 is fixed to a manually actuated handle 26. These handles are of the same construction but are preferably of different colors, for example, the handle 25 may be white and the handle 26 red or black. An amount indicator 27 is slidable on the indicator 23, and an amount indicator 28 is slidable on the position indicator 24.

The disc 8 has a slot 29 in its periphery, in which the handles 25 and 26 are slidable and guided.

The carriers 13 are each formed of a plate 30, secured to its rack 11 by fastening devices 31. A cover plate 32 is secured in position by fastening devices 33. One of the plates is recessed to receive the scale 14, which is slidable between the plates, and is restrained so that its edge is always parallel to a line X—X on the disc and carriers of the calculator.

The amount indicators have slots 34 and 35 at right angles to each other, and are provided with grooves to receive springs 36 which place a tension on the amount indicators to retain them in the positions to which they have been adjusted, since the spring bears against the wire of a position indicator.

The base 1 of the calculating instrument is fixed in position on the balancing machine by fastening devices 37, in a position accessible to the operator of the balancing machine.

The graduated radial and concentric lines which form a chart are preferably calibrated on the disc 8, but it will be apparent that the chart may be a separate sheet of paper which is secured in position on the disc in any desired or conventional manner.

The operation of the calculator will now be readily apparent to those skilled in this art and is as follows:

The relatively rotatable parts are mounted in a balancing machine and the parts are each rotated at a synchronous speed.

If the parts form an assembled unit, such as for example, a fluid coupling or drive, the headstock drive of the balancing machine is connected to the shaft end of the coupling, and the runner end of the coupling is connected to the tail end drive of the balancing machine. The first reading of the resultant unbalance of the parts is taken at any desired point in the rotation. The angle of unbalance is indicated on the machine, and the amount by the number of lines of the meter of the balancing machine.

One of the relatively rotatable parts is now angularly adjusted 180° from the other part, either while the machine is stopped or while the machine is running, depending on the type of balancing machine which is employed. A second reading of the angle and amount of resultant unbalance of the parts is then taken.

From these two readings, the angle and the amount of unbalance in each part is determined.

For the purpose of explanation we will assume that the first reading indicated an angle of 120° and an amount of 67.5.

The operator in setting up the first reading grasps the handle 25 and moves the position indicator to the 120° angle. He then moves the amount indicator to the graduation 67.5.

The second reading is now set up on the chart in a similar manner to that of the first reading. The operator grasps the handle 26 and moves the position recorder to angle 225 of the second reading, and moves amount indicator 28 to 46.5.

The two readings of the resultant unbalance of the relatively rotatable parts has now been set up on the chart.

The points indicated by the two amounts are connected by a straight line B—C, and the disc 8 is rotated to bring the line B—C parallel to the selected diameter X—X. This can be quickly done by moving the scale 14 into registry with such line.

The scale is then used to bisect the straight line B—C, and the point of bisection indicates that the unbalance in the first part has an angle of 161° and the amount approximately 35 lines, corresponding to the unbalance O—E, E being the point of bisection.

The readings as to angle and amount of unbalance are set up on the chart and are connected to form a parallelogram of forces. Instead of extending the parallelogram below the line BC, one half of the parallelogram is used and the line BC is bisected. The rotation of the unbalanced forces describes a circle and therefore a circular chart can be used. The vector OB is determined by the radial line of the circle corresponding to the angle reading and the point B showing the amount is the reading from the center of the circle on such radial line. The location of the point C is determined in the same manner from the second reading. The parallelogram can be formed on either side of the center of the circle since OE and OF.

To obtain the angle and amount of the unbalance in the second part, the scale 14 is moved to the line X—X, and the point F is determined, O—F being equal to E—C. The amount of unbalance in the second or runner part from the assumed readings will therefore be angle 270° and amount approximately 44 lines on the meter.

If the relatively rotatable parts form an assembled unit, for example a fluid coupling, the unbalance in the runner is always in the direction of C or the second reading setting, and the first reading would be for the driving part of the coupling.

What I claim as new and desire to secure by Letters Patent is:

1. A calculator for determining unbalance in relatively rotatable parts, comprising a base, a disc rotatable on said base and having a chart graduated in radial lines for angles of unbalance and in concentric lines for amounts of unbalance, two angle position indicators movable into registry with the radial lines, amount indicators slidable on said position indicators, and a scale longitudinally and laterally movable over the chart.

2. A calculator, comprising a base, a disc rotatable on said base and having a chart graduated for angles and amounts of unbalance, angle position indicators movable over the chart, amount members movable over the chart on the position indicators, and a scale mounted on the base to be moved longitudinally and at right angles to such longitudinal movement and restrained to have an edge always parallel to a fixed straight line coinciding with a diameter of the chart.

3. A calculator, comprising a base, a disc rotatable on said base and having a chart graduated in radial lines for angles of unbalance and in concentric lines for amounts of unbalance, two angle position indicators movable over the chart to register with predetermined angles, amount indicators slidable on the position indicators to indicate predetermined amounts, carriers movable in parallelism on said base, and a scale longitudinally slidable in said carriers.

4. A calculator, comprising a base, a disc rotatable on said base and having a chart graduated radially for angles of unbalance and concentrically for amounts of unbalance, two angle position indicators pivotally mounted at the center of said chart and having handles movable around the periphery of the chart, amount indicators slidable on the position indicators, spring means to cause the amount indicators to frictionally engage the position indicators, and a scale movable over the chart and restrained to have an edge always parallel to a fixed straight line coinciding with a diameter of the chart.

5. A calculator, comprising a base having a chart graduated thereon in angles and amounts of unbalance, and having parallelly disposed slots at opposite sides, racks guided in said slots, pinions meshing with said racks, a shaft journalled in said base and connected with said pinions, carriers fixed to said racks, a scale longitudinally slidable in said carriers and positioned above said chart, angle position indicators pivotally mounted at the center of said chart, and amount indicators slidable on said position indicators.

JACOB LUNDGREN.